Jan. 10, 1939.　　　K. HAMAGUCHI　　　2,143,553
EMERGENCY BRAKE FOR AUTOMOBILES
Filed April 16, 1937
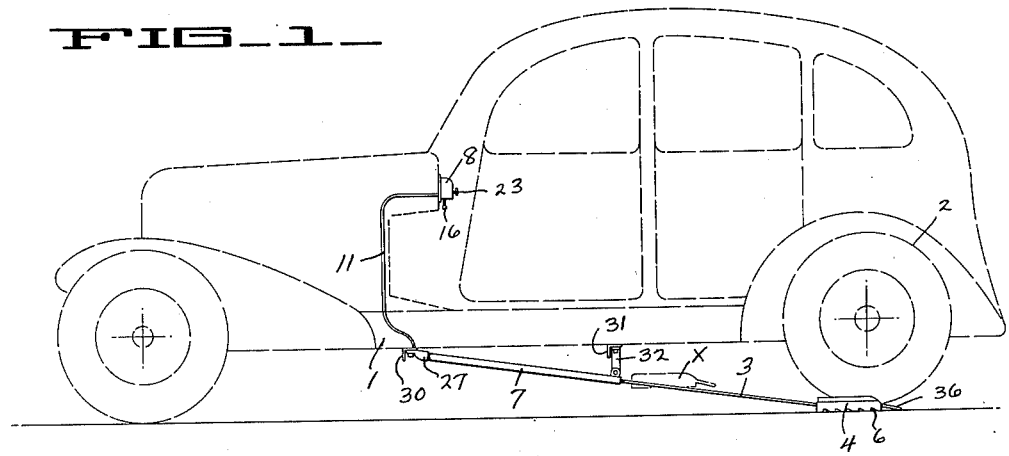
FIG_1_
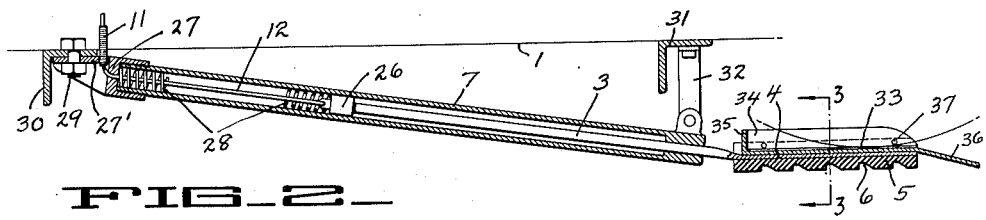
FIG_2_
FIG_4_
FIG_3_
INVENTOR.
Kaijiro Hamaguchi
BY Boykew & Wohler
ATTORNEYS

UNITED STATES PATENT OFFICE 2,143,553

EMERGENCY BRAKE FOR AUTOMOBILES

Kaijiro Hamaguchi, Setagaya-ku, Tokyo, Japan

Application April 16, 1937, Serial No. 137,239
In Japan September 30, 1936

2 Claims. (Cl. 188—4)

This invention relates to emergency brakes for automobiles, or the like, substantially shown in my Japanese patent application No. 32,723, filed in Japan September 30, 1936, and has for its objects an attachment for a vehicle separate from the usual hand or foot operated brakes, adapted to quickly stop the forward motion of the vehicle by friction means interposed between the road surface and the tread of the tires or wheels, and which means is readily returned to an inoperative position after the vehicle is stopped. Another object of the invention is improved braking means in a vehicle that will preclude the destructive wear on the tread of the wheels such as occurs where the sudden stopping of the wheels results in skidding or slipping of the wheel treads on the road surface. Other objects and advantages will appear in the specification and drawing annexed hereto.

In the drawing,

Fig. 1 shows my device in elevation in effective braking position on an automobile, the automobile being indicated in dotted lines.

Fig. 2 is a vertical sectional view through the main body of my device taken longitudinally through the body, with the device in inoperative position.

Fig. 3 is a sectional view taken along the line 3—3 of Fig. 2.

Fig. 4 is an enlarged sectional view taken through the portion of my device that is normally operated by the driver operating the braking element and for returning said element to inoperative position.

In detail, an automobile 1 is indicated in dotted line having rear wheels 2, and my braking device, (in full line in Fig. 2) is shown in the position it normally occupies on the automobile.

Said braking device comprises a brake rod 3 inclined downwardly and rearwardly in a direction from the forward end of the automobile downward toward the point of contact between the rear wheel and the road surface. The rear or lower end of the brake rod is provided with a generally horizontally disposed brake board, or shoe 4, the underside of which is provided with a relatively thick layer of relatively soft rubber 5 cross grooved on its underside as at 6 to provide a roughened surface adapted to more securely grip the ground, or road surface when the shoe is in engagement therewith.

The elevated end of rod 3 is slidably mounted within a pipe or tube 7 which is in alignment with the rod, for movement of the rod from a position with the rod substantially enclosed within the tube to a position extending downwardly and outwardly therefrom, said tube being secured at its upper end to the body or frame of the automobile 1.

Within the driver's compartment, and readily accessible to the driver, is a casing 8 containing therein a reel 9 rotatably mounted on a shaft 10. A Bowden cable 11 connects between the upper end of tube 7 and casing 8, the wire 12 within the cable connecting between the upper end of rod 3 and reel 9, the end of the wire within the reel being wound around the reel and secured to the peripheral side of the reel adjacent a side thereof as by any suitable fastening means such as bolts or rivets 13.

A wire 14 is oppositely wound on the reel 9 and secured at one end to the reel in the same manner as wire 12 is secured thereto, while the opposite end of said wire 14 extends downwardly through an opening in the bottom of casing 12 to engage in the peripheral groove of a small idler wheel 15 rotatably mounted on the bottom of the casing, the end of the wire 14 outside and adjacent the casing 8 being provided with a pull handle 16. A torsion spring 17 similar to the main spring of a clock, is secured at one end to the shaft, around which it extends, and is secured at its opposite end to reel 9 by a pin 18. At a point on the peripheral side of the reel 9, is an outwardly projecting lug 19 adapted to be engaged by a pawl 20 on the end of one arm of a bell-crank, the other arm 21 of the bell crank pivotally connecting with a rod 22 that passes relatively loosely through an opening in a wall of casing 8 to the outside where it terminates in a push button 23, a coil spring 24 being interposed between the button 23 and the casing wall to yieldably urge the button 23 outwardly at all times. The bell crank is pivoted at 25 at the junction of its arms to a lug projecting from the inner side of the casing and the arrangement of the bell crank, pawl 20 and spring 24 is such that the pawl 20 normally engages lug 19 on the reel, but upon pushing against button 23, the lug 19 is free to move past the pawl.

The upper end of rod 3 is provided with a bearing block 26 (Fig. 2) slidably, but loosely fitting within the tube 7, and extending between the block 26 and a closure cap 27 closing the upper end of the tube, is a coil spring 28, said coil spring being centrally broken away in the drawing to more clearly show the wire 12 which is encircled by the coils of the spring.

The closure cap 27 is centrally provided with an opening cap being formed with an outwardly projecting ear 27' adapted to be bolted by a bolt 29 to the frame 30 of the automobile.

The lower end of the tube 7 is supported from a cross bar 31 of the automobile frame by a link 32.

The arrangement of the wire 14, bell crank 21, pawl 20, lug 19, spring 17, spring 24 and spring 28, all of which elements, except the latter, are at casings 8, is such, that when the rod 3 will be retracted into the tube by pulling on the pull handle 16, the spring 28 will be placed under compression and when the rod is fully retracted, the pawl 20 engages lug 19 to hold the rod in the retracted position against the force of spring 28. But upon pushing the button 23, the pawl 20 will release the rod 3, and the rod will shoot quickly outwardly to jam the shoe directly to below the rear wheel 2, whereby the wheel will ride onto the shoe and as soon as the wheel is in this position the block 26 engages the closed lower end of tube 7 and the vehicle will suddenly stop, since the full weight of the rear end of the automobile is on shoe 4 which must either slide slightly on the road or cause the car to stop.

The shoe 4, in the drawing, is provided with a tire supporting plate 33 on its upper side, which plate has upwardly turned sides 34 and a closed front end 35, but the rear end is open for allowing the tire to roll onto the plate, and the plate is extended outwardly in a downward incline at 36 so that upon the shoe being released to tire receiving position, the tire of the wheel will readily run onto extension 36 and directly onto the plate. The plate, shoe 4 and rubber base 5, all are secured together, the plate and shoe being welded, bolted or riveted together and the rubber base 5 being secured in place by bolts 37, extending through upwardly projecting flanges 38 formed on the rubber base 5 and the sides 34 of the plate.

In operation, the shoe 4 is held in dotted position (Fig. 1) by lug 19 in the casing 8 being engaged by pawl 20 (Fig. 4). Upon the operator pressing button 23 the rod 3 and shoe 4 are instantly shot rearwardly under influence of spring 28 to between the wheel 2 and road surface stopping the automobile. To release the shoe 4, the automobile is backed off the shoe, forcing the shoe clear, and the operator then pulls end 16 of wire 14 (Fig. 4) pulling the shoe and rod 3 back to elevated position, the spring 17 on the reel 9 functioning only to keep the wire 12 taut during the release of the shoe to prevent continued spinning of the reel after the shoe has reached the outward limit of its movement.

Any other suitable means may be used instead of the wire 14 to withdraw the shoe 4 to elevated position, the mechanism in casing 8 merely being a quick way of accomplishing the result of releasing the shoe and withdrawing it to elevated position.

While the foregoing describes a braking device for only one of the rear wheels, a similar device is ordinarily employed for both rear wheels, and the flanges 34 on plate 33 (Fig. 3) are, of course, to prevent any side slippage of the tires of the rear wheels from a position on the plate.

I am aware that various road engaging devices have been used as emergency brakes for stopping automobiles, but such devices are injurious to the road surface and result in a too abrupt stopping of the automobile, while the relatively thick and wide rubber cushion 5 not only prevent excessive skidding, but will act to stop the automobile within a fraction of the distance possible where ordinary four-wheel brakes are employed.

Having described my invention, I claim:

1. In an automobile, a tube secured at one end to the frame of the automobile, a rod slidably supported within the tube with one end projecting outwardly of the opposite end thereof at all times, said rod being slidable from a retracted position in which the rod is substantially enclosed within the tube to an extended position in which the rod is extended outwardly of said opposite end of the tube, a ground engaging shoe secured to the end of the rod projecting outwardly of the tube, means supporting said tube and rod in a position in which the shoe is between the tread of one of the wheels of the automobile and the surface of the ground when the rod is in extended position, rod actuating means secured to said rod arranged and adapted to be actuated for causing the rod to be moved to retracted position within the tube, said means extending through said tube and out of the end of the tube adjacent the point of securement of the latter to said frame.

2. In an automobile, a tube, a rod telescopically slidable within said tube for movement longitudinally thereof from a retracted position in which the rod is substantially enclosed within the tube to an extended position in which the rod is extended outwardly of one end of the tube with one end of the rod remaining within the tube, a ground engaging shoe secured to the end of the rod that is adapted to be moved outwardly of the tube, a rod actuating cable secured at one end to the end of the rod that is adapted to remain within the tube, said cable extending through the tube and having a portion thereof extending outwardly of the opposite end of the tube, said cable being adapted to draw the rod to retracted position upon pulling the portion thereof extending outwardly of the tube, means supporting said tube in a fixed, inclined position above the ground with the shoe between the surface of the ground and one of the wheels of the automobile when the rod is in extended position, a coil spring within the tube normally urging said rod to extended position, and manually releasable means positioned within the automobile accessible to the driver for locking said rod in retracted position with the shoe free from between the ground and wheel when the cable is actuated to draw the rod to said retracted position.

KAIJIRO HAMAGUCHI.